May 27, 1924.
A. E. BREWERTON
GYRO COMPASS
Filed May 19, 1923
1,495,769
2 Sheets-Sheet 1
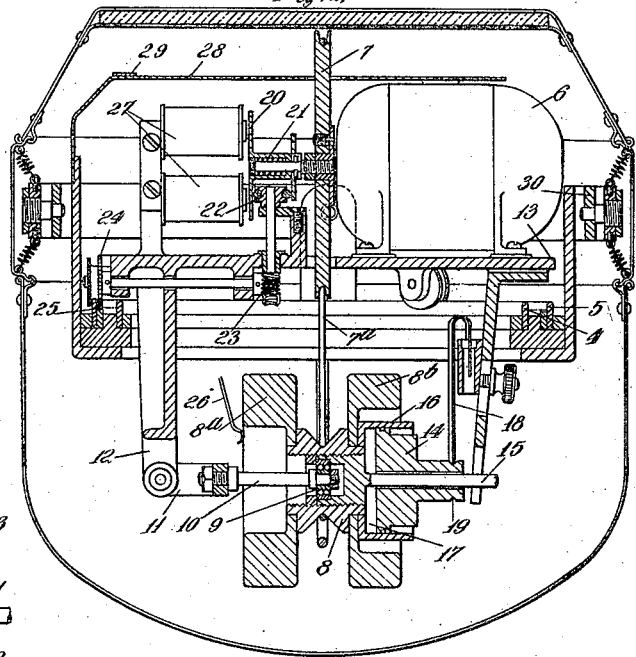
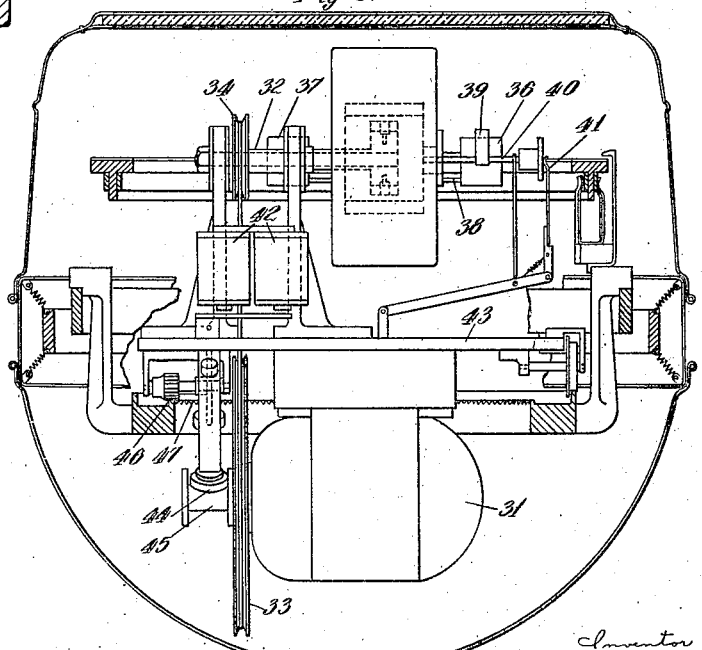

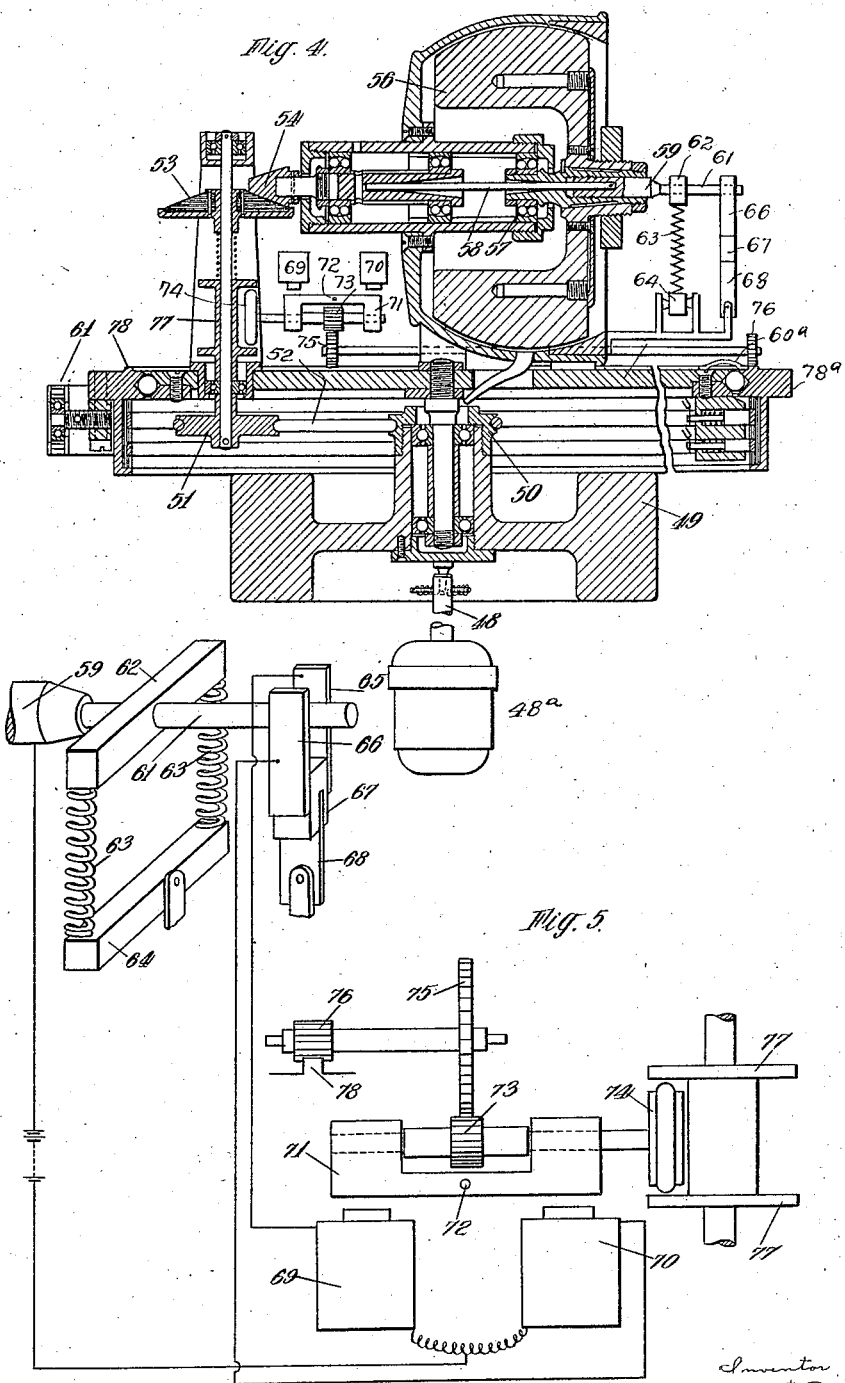

Patented May 27, 1924.

1,495,769

UNITED STATES PATENT OFFICE.

ARTHUR ERNEST BREWERTON, OF WANDSWORTH COMMON, LONDON, ENGLAND.

GYRO COMPASS.

Application filed May 19, 1923. Serial No. 639,998.

*To all whom it may concern:*

Be it known that I, ARTHUR ERNEST BREWERTON, a subject of the King of Great Britain, residing at 28 Magdalen Road, Wandsworth Common, in the county of London, England, have invented certain new and useful Improvements in Gyro Compasses, of which the following is a specification.

The object of this invention is to provide an inexpensive and reliable form of gyroscopic compass. To accomplish this I have devised an instrument the construction of which differs fundamentally from those hitherto employed. Early research work in connection with gyroscopics was carried out by Foucault who constructed a heavy wheel whose axle was supported by two bearings carried in a vertical or Cardan ring which, in turn, was supported by a "torsionless" suspension. An instrument so constructed was capable of movement responsive to the earth's rotation.

Former patent specifications describe instruments which are similar in construction to Foucault's gyroscope inasmuch as the wheel axle is supported in two bearings carried in a vertical or Cardan ring and is provided with some form of suspension which gives freedom of movement about a vertical axis. Various means, such as pendulums and levels, have been devised which apply a couple to a casing which contains the wheel to precess the gyro wheel into the meridian.

Gyro compasses constructed according to my invention differ from those previously described primarily in the fact that the gyro wheel casing, vertical ring and usual means of imparting freedom about the vertical axis are dispensed with. In the improved compass I support the wheel upon a member which affords three degrees of freedom and at the same time communicates the necessary driving power to the wheel from some external source. Various designs may be produced on the broad lines of my invention and I have illustrated four typical designs in the accompanying drawings. Figure 1 is a sectional elevation showing one of the simplest methods of support for the gyro wheel. Figure 2 is a sectional elevation of one form of complete apparatus, while Figure 3 is a sectional elevation of another form and Figure 4 a sectional elevation of yet another form, Figure 5 showing separately, for convenience of illustration to a larger scale the follow-up device shown in Figure 4.

In the form illustrated in Figure 1, the driving shaft 1 is provided with a spherical end 2, and a gyro wheel 3 is mounted upon this sphere, so that the three axes of the wheel coincide with the three axes of the sphere. Considerable friction is provided between the sphere and the wheel, but at high speeds the friction of the air on the face of the wheel is sufficient to overcome this and to allow relative motion between the wheel and the shaft about the spinning axis, thus permitting considerable freedom of movement about the horizontal and vertical axes of the wheel relatively to the shaft.

In the arrangement shown in Figures 2, 3 and 4 alternative designs of the elementary form illustrated in Figure 1 are used for the mounting of the wheel. For example, in Figure 2 a wheel in the form of a diabolo is employed with a spherical bearing placed at the intersection of the three axes, which constrains the movement of the displacement of the gyro wheel in the horizontal plane and also allows the movements in a vertical direction. In Figure 3 a universal joint is provided between the gyro wheel and the shaft driving same.

In Figure 4 the gyro wheel is supported on the spherical bearing and the driving power is conveyed by means of a flexible shaft.

In the four arrangements above referred to, in view of the rotating gyro wheel being mounted in the manner described, there are many ways of applying the necessary couple to precess it into the meridian. Most of the methods known in the gyro compass art are applicable to a gyro wheel mounted in accordance with my invention. The new method of driving the gyro wheel does however lend itself to additional means which are not applicable to the Foucault type of gyroscope.

In describing the means for precessing the gyro wheel into the meridian I have considered the couple to consist of two right angle components which I term the precessional and damping couples respectively. In practice two separate couples may be used or the effect may be produced by one couple which is the resultant of the two separate couples.

Referring now to Figure 2, a direct current supply is led into the instrument through slip rings 4, 5 to a motor 6 on a shaft of which is mounted a pulley 7 connected by a belt 7ᵃ to a belt pulley 8 on which are mounted gyro elements 8ᵃ, 8ᵇ. The parts 8, 8ᵃ, 8ᵇ form the gyro wheel, which is arranged to contain a suitable ball bearing 9 for a shaft 10, connected to a link 11 pivoted to a suitable bracket 12 on the base plate 13 of the compass. This arrangement prevents the gyro wheel from moving in a horizontal plane relatively to the baseplate 13 of the compass. The precessional couple is provided by means of a mass 14 which is mounted on an extension 15 of the gyroscope belt pulley 8 and is free to slide longitudinally and to rotate on it. At high speeds the air friction on the mass 14 is sufficient to cause a slip between it and the shaft 15. When the wheel dips or rises relatively to the earth's horizontal, the effect of gravity causes the mass 14 to slide along the shaft and to create an unbalanced condition which precesses the gyro wheel through the meridian. The extension 16 of the gyro wheel is made to enshroud the mass 14, forming an air dashpot 17, so that the latter by reason of the air imprisoned in the dashpot is incapable of sudden movement. When the gyro wheel is horizontal, the pendulous mass 14 is normally maintained in a central position by means of the spring 18 which engages in a groove 19 in the mass 14. This spring is slightly inclined to the plane of rotation of the wheel so that when distorted by the movement of the mass 14, it applies a damping couple about the vertical axis of the gyroscope so that the gyro wheel precesses to the meridian in a series of diminishing ellipses according to the well-known principles.

I have found that if the gyroscope is not rotated in the same plane as the driving pulley 7, an undesirable force is brought into play; I therefore provide means whereby the driving pulley 7 shall accurately follow all azimuthal movements of the gyroscope. This consists of a double flange pulley 20 which is normally retained in the position indicated by means of the spring 21. The one flange of the pulley is then in contact with a friction wheel 22, which, by means of a worm reduction gear 23, pinion 24 and crown wheel 25 rotate the baseplate 13 and its mountings relative to the gyro wheel. This rotation continues until a contact 26 completes an electrical circuit through the face of the wheel to an electromagnet 27. When this electromagnet becomes energized, it attracts the flanged wheel 20 and the second flange is brought into contact with the friction wheel 22. This reverses the direction of rotation of the baseplate 13 and its mountings until the circuit is broken; thereafter a hunting movement takes place whereby the plane of rotation of the wheel 7 is kept substantially in the same plane as that of the gyroscope. A compass card 28 is mounted on the baseplate 13 and the compass direction is read off against a lubber's point 29. A gimbal ring 30, together with the usual trunnions is provided according to well-known practice.

Figure 3 represents a complete instrument designed according to my invention wherein the wheel is mounted upon a universal joint. In this figure an electric motor 31 drives a shaft 32 by means of the pulleys and belt 33, 34 and 35. In this arrangement the precessional couple is provided by means of two boxes 36 and 37 which contain mercury. The boxes are interconnected by means of a tube 38 and pivotally mounted so as to be capable of movement about an approximately horizontal axis. According to this arrangement when the gyro wheel tilts relatively to the horizontal, due to the earth's rotation, the mercury flows from one box into the other, causing a displacement of weight which provides the necessary precessional couple. The damping couple in this instance is introduced by arranging the mercury box to pivot about an axis which is slightly displaced from the horizontal. Thus, when tilting under the influence of the gyroscope they have a horizontal component to their movement which exerts a couple about the vertical axis. The connection between the mercury box system and the gyroscope is by means of a link 39 and shaft extension 40. The follow-up system in this instance is similar to that shewn in Figure 2.

A contact 41 completes circuit to an electromagnet 42 when suitable displacement of the baseplate 43 takes place. The magnet brings a friction wheel 44 into engagement with one side of a double flange pulley 45 and drives a pinion 46 through worm reduction gear, the pinion gearing with a rack 47 on the baseplate.

Figure 4 describes further developments of my invention and shows the preferred embodiment in which an electric motor 48ᵃ through a shaft 48 drives a horizontally rotating wheel 49 which, by means of pulleys 50, 51, belt 52 and friction drive 53, 54, drives a shaft 55. The gyro wheel 56 in this instance is supported on a spherical bearing 57 and is connected by means of the flexible shaft, spring or chain 58 to the driving shaft 55. I have found by experiment that in a system of this description, when the gyro wheel is not in the same plane of rotation as that of the driving shaft, there is a restoring couple dependent upon the driving torque transmitted to the wheel and the angle through which the wheel is displaced. I therefore make use of this restoring force to provide the necessary damping. I have also found that the distortion of the flexible coupling exerts a force which precesses the gyro wheel at right angles to the tilt due to the earth's rotation; the distortion of the flexible shaft imposes a couple on the wheel which precesses it towards the meridian and synchronously the restoring couple damps out the oscillations about the meridian.

The rate of precession in azimuth depends upon the flexibility or tension of the flexible coupling 58 and this is therefore made adjustable by means of a threaded member 59. In order to increase the precessional couple beyond that afforded by the distortion of the flexible shaft, I make use of the spring control indicated in Figure 4, and to a larger scale and somewhat diagrammatically in Figure 5. 61 represents an extension of the gyro shaft 59; carried on this extension is a cross member 62 which is attached to two springs 63, whose lower extremities are connected to a second cross member 64; the cross member 64 being pivotally mounted upon the baseplate 60 of Figure 4. Normally these springs impose no couple upon the gyro wheel, or they may be adjusted to impose that couple which is necessary to keep the compass on the meridian when situated above or below the earth's equator. When the gyro wheel tilts relatively to the earth's horizontal, these springs become compressed or extended and exert a couple about the vertical axis.

The follow-up system for this type of compass is similar to that indicated in Figures 2 and 3, contact being made and broken by means of a suitable contact situated on an extension of the shaft 59. On the extension 61 of the gyro shaft 59 are two contact members 65, 66 which are attached to an insulated member 67 which is mounted upon the baseplate 60 by the flexible member 68 which keeps this contact system normally vertical. The contact members 65, 66 are connected to two electromagnets 69, 70 in the manner indicated.

When the baseplate 60 of the compass and the gyro wheel turn in azimuth relatively one with the other, the shaft extension, which is connected to one pole of an external supply, comes into contact with a member 65 or 66, one of the electromagnets 69 or 70 then becomes energized and attracts the member 71 which is pivotally mounted about the point 72 and carries in bearings a pinion 73 and friction roller 74.

When one magnet is energized the friction roller 74 is brought into contact with the flanged pulley 77 of Figure 4. The friction roller then rotates and turns the wheel 75 and pinion 76. The pinion 76 is permanently in mesh with the rack 78 so that the baseplate 60 is turned and follows the movements of the gyroscope. The horizontally rotated wheel 49 is provided in order to stabilize the compass so that the baseplate 60 remains substantially horizontal within the gimbal system 61.

The baseplate 60 may be graduated to serve as the compass card and a fixed pointer 60$^a$ be fitted to the rack carrying ring 78$^a$ to form the lubber line.

What I claim and desire to secure by Letters Patent of the United States is:—

1. In a gyro compass, a recessed gyro wheel, a wheel supporting member extending into the recess of the said wheel and a bearing for the wheel within the said recess, which bearing provides three degrees of freedom for the wheel, the bearing including inner and outer raceways, one of which is curved in cross section.

2. In a gyro compass as in claim 1, a shaft passing through the said wheel supporting member and the bearing and transmitting the driving power to the wheel.

3. In a gyro compass as in claim 1, a flexible shaft passing through the supporting member and adapted to exert a torque upon the wheel mounting on angular movement of the wheel axis relatively to the axis of the support.

4. In a gyro compass, a gyro wheel and a single wheel supporting a member giving three degrees of freedom to the wheel, a shaft transmitting the driving power to the wheel, which shaft passes through the supporting member without taking part in the support of the wheel.

5. In a gyro compass, a gyro wheel and a single wheel supporting member giving three degrees of freedom to the wheel, a flexible shaft adapted to transmit power to the wheel, and bearings in the wheel supporting member for both ends of the said flexible shaft, which bearings provide for bending of the shaft on angular movement of the wheel axis relatively to the supporting member.

6. In a gyro compass, a gyro wheel and a single wheel supporting member giving three degrees of freedom to the wheel, a flexible shaft adapted to transmit power to the wheel, bearings in the wheel supporting member for both ends of the said flexible shaft, and shaft carrying members within the said bearings having bell-mouthed openings receiving the shaft and providing for smooth flexing of the shaft.

7. In a gyro compass, a gyro wheel, wheel driving means entirely external to the wheel and rotating at a speed different to the wheel and mechanical speed multiplying transmitting gear between the driving means and the wheel.

8. In a gyro compass, a gyro wheel, a wheel driving shaft, a coupling between the driving shaft and wheel, a mounting for the wheel permitting angular movement of its axis relatively to the shaft and damping means due to the couple tending to restore the wheel axis upon deviation of the said axis from the normal.

9. In a gyro compass, a pendulous gimballed system and a mechanically driven vertical axle gyroscope concentric with the gimballed system and adapted to stabilize it.

10. In a gyro compass, the combination of a gyro wheel, a stabilizing gyro and a follow-up system with a single electric motor from which all the aforesaid elements derive their power.

11. In a gyro compass, an orienting gyroscope, a shaft, means for continuously rotating the shaft, a follow-up system and compass controlled means for driving the follow-up system from the said shaft.

12. In a gyro compass, an orienting gyroscope, a shaft, means for continuously rotating the shaft, a follow-up system and a compass controlled friction gear driving the follow-up system in either direction from the said shaft.

13. In a gyro compass, an orienting gyroscope, a shaft, means for continuously rotating the shaft, a follow-up system, a pair of flanges on the said shaft, a friction wheel between the said flanges, transmission gear between the friction wheel and the follow-up system, and magnetically controlled means for moving the friction wheel on to either of the said flanges.

14. In a gyro compass, an orienting gyroscope, a shaft, means for continuously rotating the shaft, a follow-up system, a pair of flanges on the said shaft, a friction wheel between the said flanges, transmission gear between the friction wheel and the follow-up system and a compass controlled rocking member carrying the said friction wheel and adapted to move it on to either of the said flanges.

15. In a gyro compass, a gyro wheel, a supporting member giving freedom for angular movement of the wheel axis, a flexible shaft driving the said wheel and bending in a resilient manner on angular movement of the wheel axis, an axial extension of the gyro wheel and an auxiliary spring control device acting on the said extension upon tilting of the gyro wheel axis.

16. In a gyro compass, an orienting gyroscope, a follow-up system, a mechanical drive for the follow-up system, electrical means for controlling the direction of drive, and gyroscopically operated electrical contacts adapted to close the controlling electrical circuit.

ARTHUR ERNEST BREWERTON.